United States Patent [19]

Sharp

[11] 4,181,472

[45] Jan. 1, 1980

[54] LIQUID DISPENSING WINDSHIELD WASHER PUMP

[75] Inventor: Bernard C. Sharp, White Plains, N.Y.

[73] Assignee: Parker-Hannifin Corporation, Shelton, Conn.

[21] Appl. No.: 859,875

[22] Filed: Dec. 12, 1977

[51] Int. Cl.² ............................................. F04B 17/00
[52] U.S. Cl. .................................... 417/363; 310/91; 417/410; 418/154
[58] Field of Search ............... 417/424, 423 R, 423 A, 417/410, 363; 310/91, 51, 258, 259, 116, 117; 418/154

[56] References Cited

U.S. PATENT DOCUMENTS

| 1,809,603 | 6/1931 | Reed | 417/363 X |
|---|---|---|---|
| 2,387,533 | 10/1945 | Schmucker | 310/117 |
| 2,974,767 | 3/1961 | Fulton | 418/154 X |
| 3,179,058 | 4/1965 | Meagher | 417/424 |
| 3,183,842 | 5/1965 | Sadler et al. | 418/154 |
| 3,256,828 | 6/1966 | Rule | 417/424 |
| 3,264,999 | 8/1966 | Tutthill | 417/424 |
| 3,303,791 | 2/1967 | Doble | 418/154 |
| 3,407,747 | 10/1968 | Rule | 417/424 |
| 3,666,219 | 5/1972 | Baus | 310/91 X |
| 3,829,248 | 8/1974 | Bright et al. | 418/154 X |
| 3,861,831 | 1/1975 | Rule | 417/424 |

Primary Examiner—Carlton R. Croyle
Assistant Examiner—Edward Look
Attorney, Agent, or Firm—Albert C. Johnston; Ronald A. Clayton

[57] ABSTRACT

A liquid dispensing pump of the motor-driven flexible vane impeller type suitable for use in an automobile windshield washer system includes a housing that defines a motor chamber having a motor supporting end wall. A closure wall is fixed to the end wall and an impeller chamber having a peripheral surface is defined between the walls. An impeller is rotatable in the impeller chamber by a motor supported in the motor chamber, which has a shaft that extends through an opening in the end housing wall. Inlet and outlet passages respectively conduct liquid to and from the impeller chamber. This pump further comprises the improvement that the impeller chamber is constituted by confronting recesses, formed in the closure and end walls, that are circumferentially bounded by portions of the walls that have confronting surfaces meeting at a tight interface. The interface bounds the peripheral impeller chamber surface. In addition, the motor chamber is closed by a cover plate fastened to an end of the housing opposite the end wall. A spring is compressed between the cover plate and motor body to hold the motor body non-rotatably in working position against the end wall.

12 Claims, 5 Drawing Figures

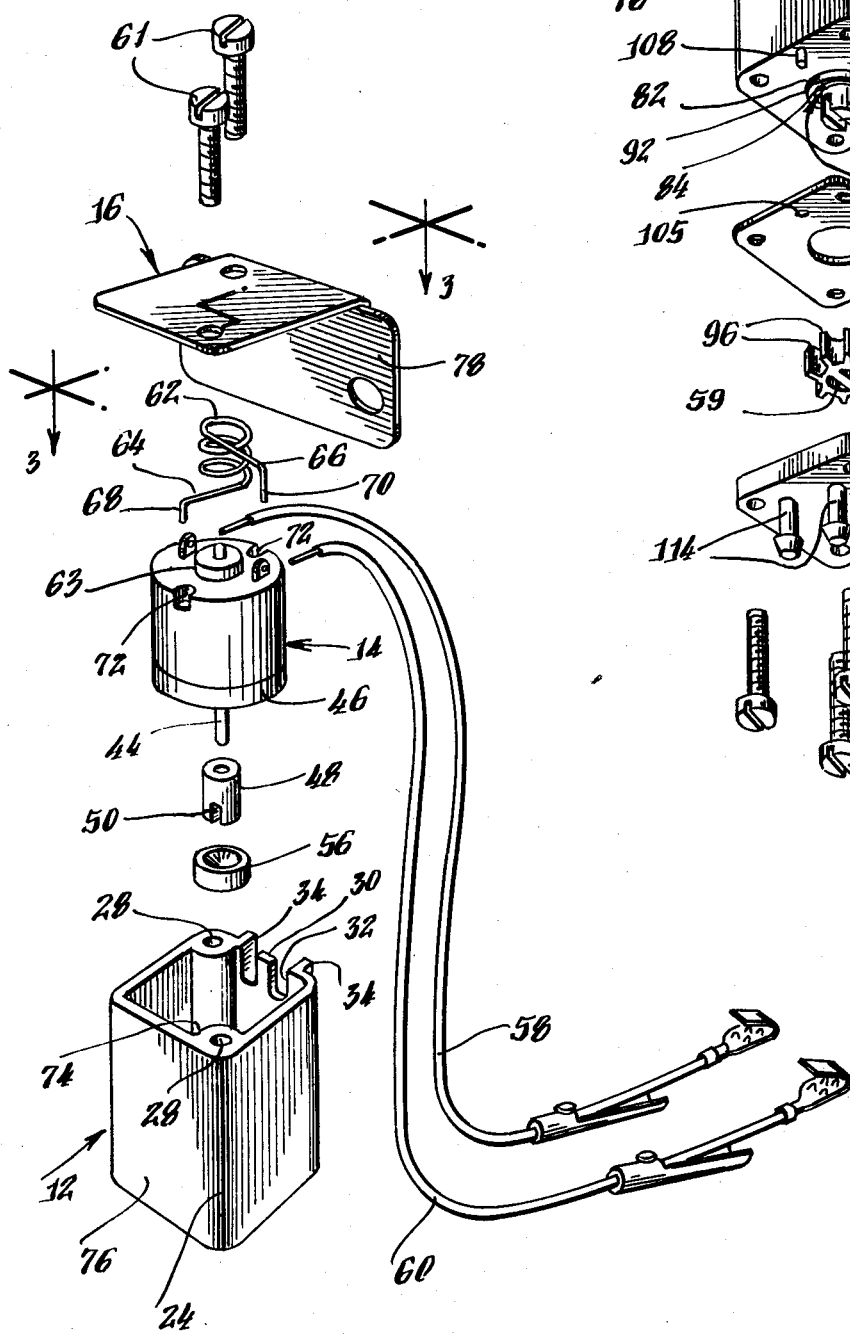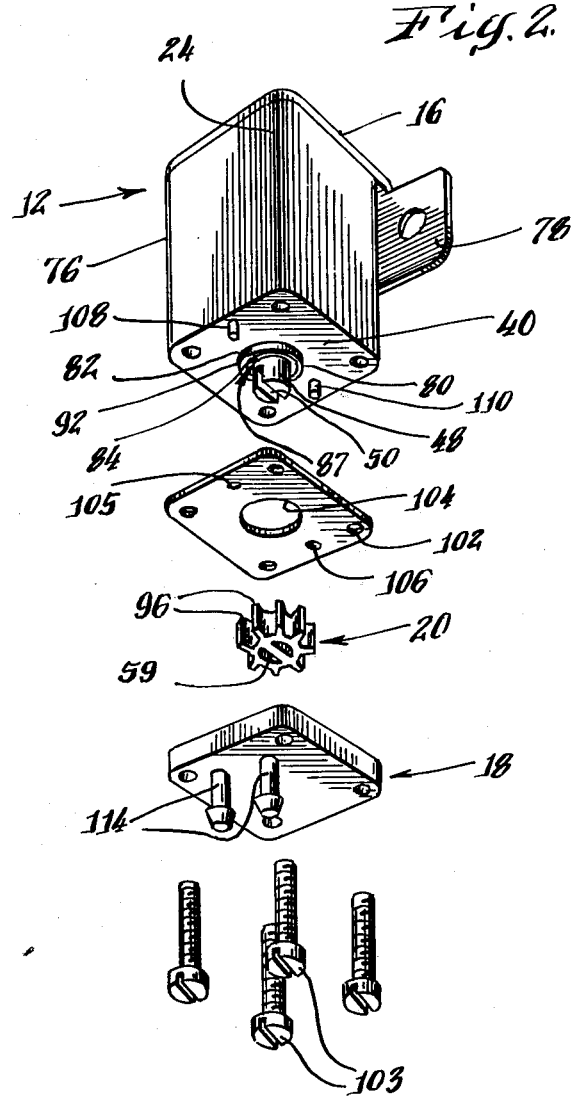

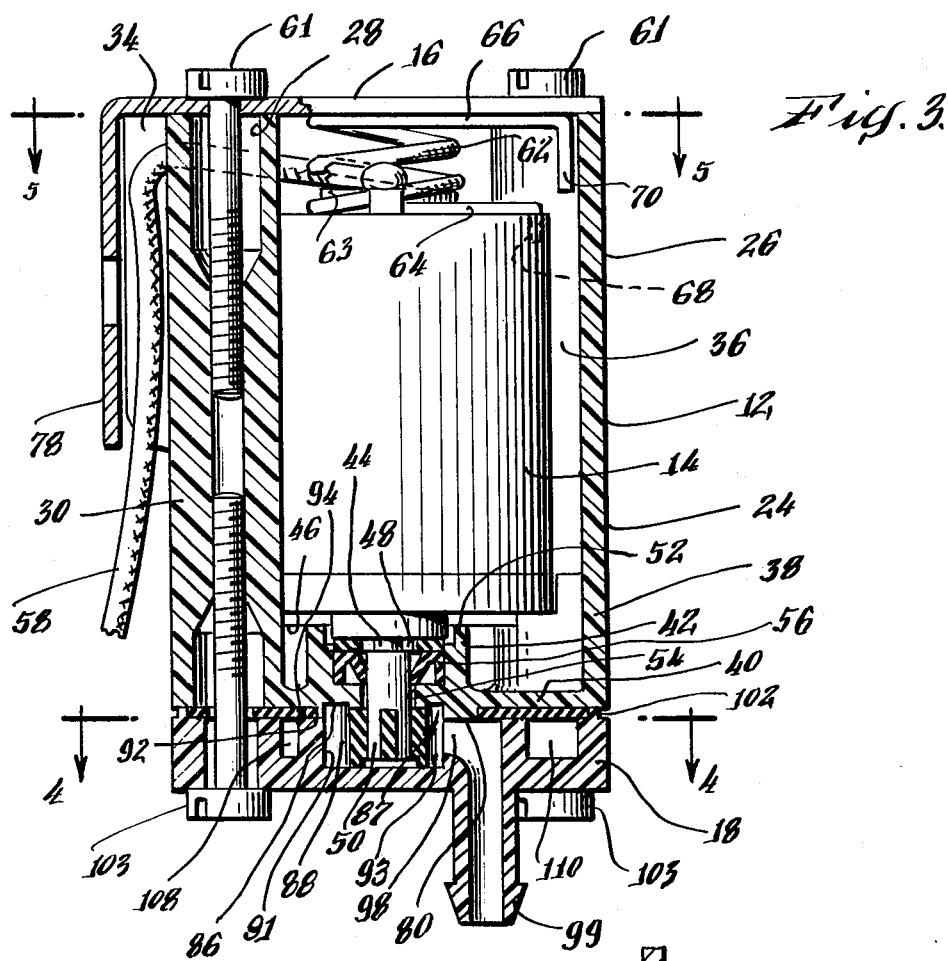
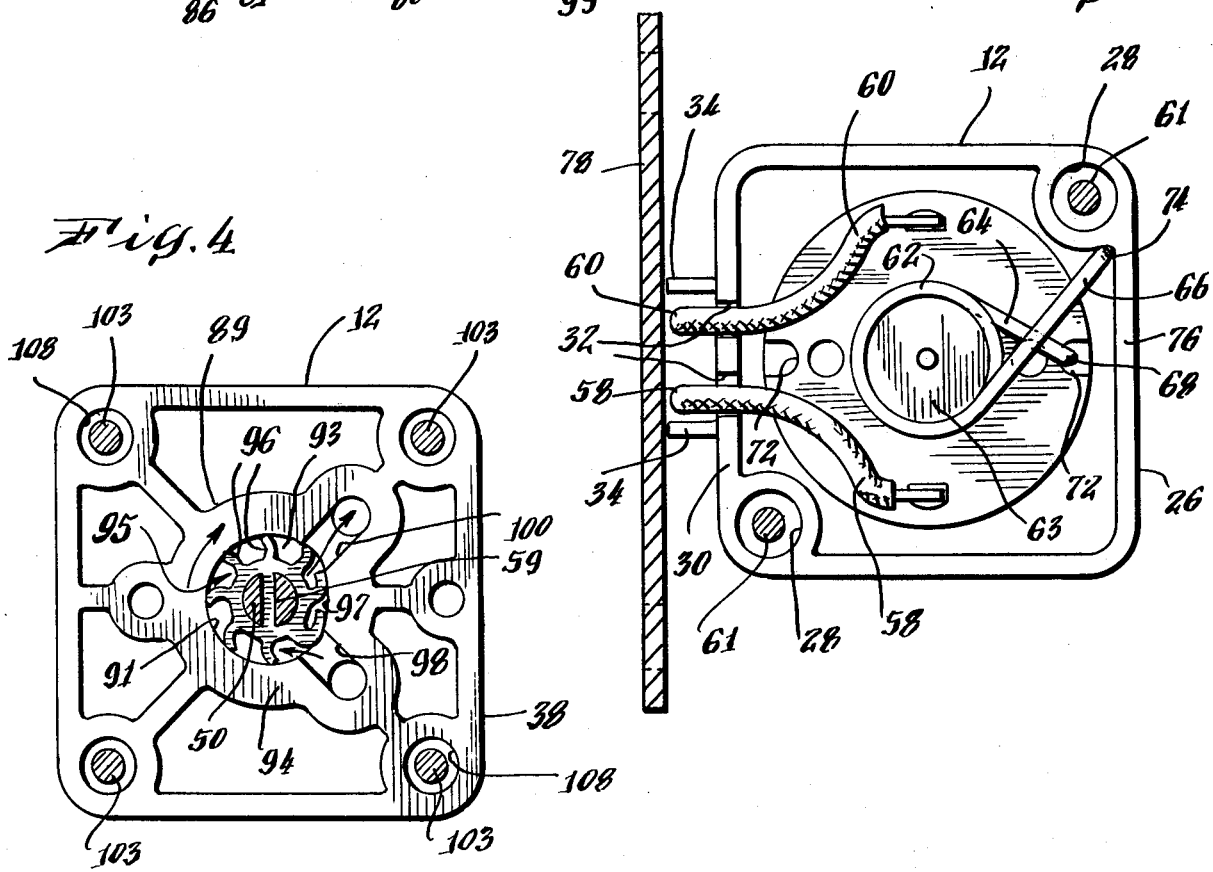

LIQUID DISPENSING WINDSHIELD WASHER PUMP

The present invention relates to a pump for dispensing windshield washer fluid to the windshield of an automobile.

The liquid dispensing pump of the invention may be incorporated as original equipment in an automobile or may be fitted when the pump supplied as original equipment needs replacement. Further, the pump is of the type that includes an impeller, powered by an electric motor, to rotate in an impeller chamber and having flexible vanes that bear against the peripheral side impeller chamber wall.

A replacement windshield washer pump is available commercially that includes a two-part housing and a support plate fixed to one of the housing parts for mounting the pump for use. The housing forms a chamber which contains a motor arranged to drive an impeller fitted in a chamber bounded at one side by a sealing gasket confined between an end wall of the motor chamber and a closure wall fixed to the housing. The other sides of the impeller chamber are defined by an inserted cup-like liner having an eccentric peripheral wall against which the flexible vanes of the impeller bear to effect a pumping action. Liquid enters the impeller chamber through an opening in the liner from an inlet passage formed in the end wall of the motor chamber, via an opening in the gasket which communicates with an opening in the closure wall. Liquid pumped by the vanes passes out of the impeller chamber through another liner opening that leads to an outlet passage in said end wall and thence through another gasket opening to an opening in the closure wall.

It is an object of the present invention to provide a liquid dispensing pump, suitable for use as original or replacement equipment in the windshield washing system of an automobile, that incorporates features of construction giving it improved operating characteristics and enabling manufacture of the pump with relatively few parts and relatively economically, as compared with the known pump mentioned above.

The liquid dispensing pump of the invention is similar to known pumps in that it includes a housing that defines a motor chamber having a motor supporting end wall, with a closure wall fixed to the end wall and an impeller chamber defined between these two walls. Also, an electric motor is supported in the motor chamber and has a rotatable shaft that extends through an opening in the end wall to drive the impeller in the impeller chamber.

According to a feature of the present invention, the impeller chamber is constituted by confronting recesses formed respectively in the closure wall and the end wall, which recesses are bordered circumferentially by respective portions of these walls that have confronting surfaces meeting in a tight interface about the peripheral surface of the impeller chamber, and the vanes of the impeller bear directly against this peripheral surface. This construction forms an even impeller chamber having the eccentric configuration required for the pumping action of the impeller vanes, so that it does not require a liner.

Further, inlet and outlet passages for the liquid to be pumped lead into and from the impeller chamber through portions of these passages which are defined by channels formed in the chamber bordering portion of the closure wall that mates with the chamber bordering portion of the end wall. Each of these channels extends substantially radially of the impeller chamber and the channels are formed by molding them to a cross-sectional shape desired for the efficient flow of liquid into and from the impeller chamber. Thus, they can be and preferably are made substantially rectangular in cross-section.

According to another feature of the invention, a simplified arrangement is provided for mounting the motor in the motor chamber of the pump housing. For this purpose, the body of the motor is seated on a support formed on the end wall of the motor chamber and is held non-rotatably in working position against this end wall by a spring compressed between the body of the motor and a cover plate that is fastened to an end of the housing opposite the chamber end wall. The spring has radially protruding ends, one of which is linked to the motor body and the other of which is linked to the housing.

Other objects, features and advantages of the invention will be understood from the following detailed description and the accompanying drawings of an illustrative embodiment of the invention. In the drawings:

FIG. 1 is an exploded perspective view of the components of the liquid dispensing pump of the present invention, looking downwardly from the front of the pump.

FIG. 2 is a second exploded view of the components of the liquid dispensing pump looking upwardly from the front of the pump.

FIG. 3 is a vertical cross-sectional view of an assembled liquid dispensing pump taken through plane 3—3 in FIG. 1.

FIG. 4 is a horizontal cross-sectional view taken through plane 4—4 in FIG. 3, illustrating the flexible vane impeller positioned for rotation in the eccentric impeller chamber.

FIG. 5 is a horizontal cross-sectional view taken through plane 5—5 in FIG. 3, illustrating the manner in which the motor positioning spring is linked to the motor body and to the housing.

DETAILED DESCRIPTION OF THE PREFERRED EMBODIMENT

FIG. 1 illustrates several of the components of the liquid dispensing pump of the present invention in position for sequential assembly. FIG. 2 illustrates the remaining components of the invention that may be assembled most conveniently after those illustrated in FIG. 1.

The main components of the pump include a housing 12, an electric motor 14, a cover plate 16, shown in FIG. 1, and a closure wall 18, and an elastomeric flexible vane impeller 20 shown in FIG. 2.

The pump housing 12 may be made from any suitable material, such as plastic, using any suitable technique, such as injection molding, and includes an elongated body 24 (FIG. 3) that is generally square in horizontal cross-section (FIGS. 4 and 5). The upper portion 26 of the housing body 24 is formed with two screw-receiving cylinders 28 positioned in diagonally opposing body corners. Adjacent one of these cylinders, one side wall 30 of the housing body is formed with two U-shaped notches 32 which are bounded on the side wall exterior by two vertically arranged, sidewardly projecting ribs 34. The notches provide access to the housing interior for motor leads and the ribs confine the leads in a manner to be described below.

The housing 12 further defines a motor chamber 16, in which the motor 14 is mounted, and, at its lower end 38, is formed with an end wall 40 having a motor supporting structure 42 that projects into the motor chamber 36.

The motor 14, which for most domestic automobile applications is adapted to operate in a 12 volt electrical system, is cylindrical, having a drive shaft 44 which projects axially from one of its ends 46. The shaft is equipped with a cylindrical shaft key 48, attached to rotate therewith, having a slotted axially projecting blade 50. As can be seen in FIG. 3, when the motor is mounted in the motor chamber 36, its body end 46 abuts the upwardly projecting surface 52 of the motor supporting structure 42. Further, the housing end wall is formed with an opening 54 through which at least the blade 50 projects. A portion of the motor supporting structure 42 is cylindrical and is shaped to receive a ring seal 56 which has an inverted V-shape in cross-section, to seal about the shaft key 48.

The impeller 20 is formed with two diametrically extending slots 59 that are engaged by the blade 50 and may be rotated by the motor in a manner to be described in greater detail below.

The motor is electrically connected to the remainder of the 12 volt system in the automobile in which it is installed by two leads 58 and 60 which pass through notches 32 and downardly along the side wall 30 of the housing between the ribs 34.

The pump of the invention incorporates a first improvement that simplifies its construction while firmly and properly locating the motor in its working position. In particular, the motor is urged to the working position by the cover plate 16, which is secured to the housing body by screws 61 tapped into cylinders 28 (FIG. 3), and a helical, motor-retaining coil spring 62, which is compressed between the plate and motor body. The motor body is formed with an axially projecting cylindrical boss 63. The radius of the spring helix is slightly larger than that of the boss so that the spring may be properly located by having at least some of its coils placed over the boss. The spring is further formed at its opposing ends with radially protruding end portions 64 and 66, each of which has a leg 68 and 70 respectively, bent at an angle of approximately 90° to the end portion. The first end portion 64 is linked to the motor 14 by engagement of the leg 68 in a notch 72 formed in the motor body. The leg 70 of the second end portion 66 is engaged in a niche 74 defined between the inner surface of one of the housing side walls 76 and one of the screw-receiving cylinders 28.

Since the spring 62 is compressed between the cover plate and the motor body, the motor is urged into firm engagement with the motor supporting structure 42. Further, since the spring is linked to both in the motor body and the housing respectively by the end portion 64 and 66, the motor is held against rotation in the motor chamber.

The cover plate 16 is also formed with a bracket 78, bent at an angle of approximately 90° to the remainder of the plate, that closely approaches the side extreme of ribs 34 to confine the leads 58 and 60 therebetween as can be seen in FIG. 3. Accordingly, the cover plate and spring assembly firmly hold the motor in working position and confine the motor leads to the outside of one side wall of the housing so that it may be connected to the remainder of the electrical system of the automobile.

In addition, the bracket provides a means for fastening the pump to a support for mounting purposes.

The liquid dispensing pump of the present invention also incorporates other improvements which enhance its operating efficiency. These improvements are illustrated in FIGS. 2, 3 and 4. As shown there, the lower side of the motor housing end wall is formed with a ring portion 80 that projects from the planar wall surface and has a right cylindrical outer peripheral surface 82 and an eccentric cylindrical inner peripheral surface 84. The inner peripheral surface 84 and the base surface 86 inside the ring portion 80 define a recess 87 which constitutes a portion of the impeller chamber 88.

The closure wall 18 is formed similarly with a recess 95 having a base surface 93 and an eccentric cylindrical peripheral surface 91 shaped as the mirror image of the surface 84. The recess 95 is bordered circumferentially by a portion 89 of the closure wall that mates with ring portion 80 of the housing end wall so that, when the closure wall is fixed in place (FIG. 3), respective confronting surfaces 92 and 94 of the wall portions 80 and 89 are held together, meeting at a tight interface about the peripheral surface of the impeller chamber formed by the two recesses.

The chamber bordering portions 80 and 89 are brought into tight interengagement at the interface of their surfaces 92 and 94 when the closure wall is secured to the housing, for instance, by screws 103 which are tapped into the screw-receiving cylinders at the housing corners. At the same time, a sealing gasket 102 is compressed between surfaces of the walls 40 and 18 located circumferentially of the wall portions 80 and 89. The gasket 102 is formed with a central opening 104 so that it fits closely about the ring portion 80 of wall 40. Further, the gasket is formed with asymmetrically located pin holes 105 and 106 which fit into similarly located pins 108 and 110 formed on the housing end wall, to position the gasket properly during assembly.

As noted above and as can be seen in FIG. 4, the impeller chamber has an eccentric cylindrical shape having one flattened side 97 which deviates from a right cylindrical shape. The impeller 20 is mounted therein and includes a number of radially projecting flexible vanes 96 that bear against the assembled inner peripheral surface of the impeller chamber. The flattened side 97 of the chamber is in a region between a radially extending inlet passage 98 and a radially extending outlet passage 100. The portions of these passages leading to and from the impeller chamber are defined by channels which are formed in the surface 94 of the closure wall and are closed by the surface 92 of the housing end wall. The channels are made substantially rectangular in cross-section. They communicate with outer portions of the passages leading to connector conduits 99 and 101 to which tubing may be connected to join the pump with the remainder of a windshield washer system.

As seen in FIG. 3, portions of the gasket 102 where it surrounds ring portion 80 of the end wall 40 border the upper side of outer portions of inlet and outlet passages 98 and 100, but no portion of these passages either extends through the gasket or is susceptible to being obstructed by gasket material in the event of a swelling or other deformation of the gasket.

When the motor 14 in chamber 36 is energized, the motor rotates the impeller 20 in chamber 88 so that the vanes 96 moving along the peripheral surface of this chamber past the inlet passage 98 force liquid into chamber 98 and then are compressed as they move along the flattened region 97 to the outlet passages 100, thus forcing liquid out of the pump through conduit 101.

The housing 12 and the closure wall 18 of the described liquid dispensing pump can each be formed as an integral molding of a suitable plastic material, being, for instance, injection molded bodies of a thermoplastic such as polycarbonate or acetal resin. These principal components, together with the motor 14, the impeller 20, the spring 62 and fittings as illustrated in the drawings constitute the entire pump. Although a specific embodiment of the present invention has been described above is detail, it is to be understood that this is for purposes of illustration. Modifications may be made in the form of the component parts or in their arrangement in order to adapt them to particular requirements of manufacture or use of the pump.

What is claimed is:

1. In a positive-pressure liquid dispensing pump of the motor driven vane type that includes
   a housing defining a motor chamber having a motor supporting end wall,
   a closure wall fixed to said end wall,
   an impeller chamber defined between said walls,
   an impeller rotatable in and having vanes bearing against a peripheral surface of said impeller chamber,
   an electrical motor supported in said motor chamber and having a rotary shaft extending through an opening in said end wall for driving said impeller, and
   inlet and outlet passages respectively for conducting fluid into and from said impeller chamber;
   improvements which comprise:
   the improvement wherein said impeller chamber is constituted by confronting recesses formed respectively in said closure wall and said end wall, said recesses being bordered circumferentially by respective portions of said walls that have confronting surfaces meeting at a tight interface about said peripheral surface,
   the improvement wherein each of said passages comprises a channel, extending substantially radially of said impeller chamber, formed in said portion of said closure wall and covered by said portion of said end wall; and
   a sealing gasket compressed between surfaces of said walls peripherally of said interface and constituting a portion of a side surface of each of said passages,
   whereby said peripheral surface of said impeller chamber is evenly constituted so that said impeller vanes effect positive-pressure pumping action by bearing thereagainst, and
   whereby said passages do not extend through said sealing gasket and deformation of said sealing gasket does not obstruct said passages.

2. A pump according to claim 1 wherein each of said channels is substantially rectangular in cross-section.

3. A pump according to claim 1 wherein said end wall presents, inside said motor chamber about said opening, an upstanding support structure engaged by the body of said motor, said support structure having an elastic sealing ring confined therein in sealing engagement with said motor shaft.

4. A pump according to claim 1 wherein said motor chamber is closed by a cover plate fastened upon an end of said housing away from said end wall, and wherein said pump further comprises
   means including a spring compressed between said cover plate and the body of said motor for holding the motor body non-rotatably in working position against said end wall.

5. A pump according to claim 4 wherein said spring is a helically coiled spring having radially protruding end portions, one of said end portions being linked to said motor body and the other being linked to said housing.

6. A pump according to claim 5 wherein said housing forms niches in said motor chamber, said other of said spring end portions being confined in one of said niches.

7. A pump according to claim 4 wherein said cover plate is a portion of a bracket having a base portion fitting over a side of said housing and fastenable to a support for mounting the pump.

8. In a liquid dispensing pump of the motor-driven vane type that includes
   a housing defining a motor chamber having a motor supporting end wall and forming a niche in said motor chamber,
   a closure wall fixed upon said end wall,
   an impeller chamber defined between said walls,
   an impeller rotatable in and having vanes bearing against a peripheral surface of said impeller chamber,
   an electric motor supported in said motor chamber and having a rotary shaft extending through an opening in said end wall for driving said impeller, and
   inlet and outlet passages respectively for conducting fluid into and from said impeller chamber,
   the improvement comprising:
   said motor chamber being closed by a cover plate fastened over an end of said housing away from said end wall, and
   means including a spring compressed between said cover plate and the body of said motor for holding the motor body in working position against said end wall and for preventing relative rotation of said motor body and said housing, said spring being a helically coiled spring having radially protruding end portions one of which is linked to said motor body and the other of which is confined in said niche.

9. A pump according to claim 8, wherein said cover plate is a portion of a bracket having a base portion fitting over a side of said housing and fastenable to a support for mounting the pump.

10. In a positive-pressure dispensing pump of the motor-driven vane type that includes
    a housing defining a motor chamber having a motor supporting end wall,
    a closure wall fixed upon said end wall,
    an impeller chamber defined between said walls,
    an impeller rotatable in and having vanes bearing against a peripheral surface of said impeller chamber,
    an electric motor supported in said motor chamber and having a rotary shaft extending through an opening in said end wall for driving said impeller, and
    inlet and outlet passages respectively for conducting fluid into and from said impeller chamber,
    improvements comprising:
    the improvement wherein said impeller chamber is constituted by confronting recesses formed respectively in said closure wall and said end wall, said recesses being bordered circumferentially by respective portions of said walls which have confronting surfaces meeting at a tight interface about said peripheral surface, and the improvement wherein each of said passages comprises a channel, substantially rectangular in cross-section extending substantially radially of said impeller chamber, formed in said portion of said closure wall and covered by said portion of said end wall, a sealing gasket compressed between surfaces of said walls peripherally of said interface and constituting a portion of a side surface of each of said passages;

said end wall presenting, inside said motor chamber about said opening, an upstanding support structure engaged by the body of said motor, said support structure having an elastic sealing ring confined therein in sealing engagement with said motor shaft, a cover plate fastened over an end of said housing away from said end wall for closing said motor chamber, and means including a helically coiled spring compressed between said cover plate and said motor body for holding said body non-rotatably in working position against said motor support structure, said housing forming a niche in said motor chamber, said spring having radially protruding end portions one of which is linked to said motor body and the other of which is confined in said niche.

11. In a liquid dispensing pump of the motor-driven vane type that includes
  a housing defining a motor chamber having a motor supporting end wall and forming a niche in said motor chamber,
  a closure wall fixed upon said end wall,
  an impeller chamber defined between said walls,
  an impeller rotatable in and having vanes bearing against a peripheral surface of said impeller chamber,
  an electric motor supported in said motor chamber and having a rotary shaft extending through an opening in said end wall for driving said impeller, and
  inlet and outlet passages respectively for conducting fluid into and from said impeller chamber,
  the improvement comprising:
  said motor chamber being closed by a cover plate fastened over an end of said housing away from said end wall, and
  means compressed between said cover plate and the body of said motor for holding the motor body in working position against said end wall and for preventing relative rotation of said motor body and said housing, said means being linked to said motor body in non-rotative relation thereto and having at least one generally radially protruding portion confined in said niche.

12. In a positive-pressure liquid dispensing pump of the motor driven vane type that includes
  a housing defining a motor chamber having a motor supporting end wall and forming a niche in said motor chamber,
  a closure wall fixed upon said end wall,
  an impeller chamber defined between said walls,
  an impeller rotatable in and having vanes bearing against a peripheral surface of said impeller chamber,
  an electric motor supported in said motor chamber and having a rotary shaft extending through an opening in said end wall for driving said impeller, and
  inlet and outlet passages respectively for conducting fluid into and from said impeller chamber,
  improvements comprising:
  the improvement wherein said impeller chamber is constituted by confronting recesses formed respectively in said closure wall and said end wall, said recesses being bordered circumferentially be respective portions of said walls which have confronting surfaces meeting at a tight interface about said peripheral surface, and
  the improvement wherein each of said passages comprises a channel, substantially rectangular in cross-section extending substantially radially of said impeller chamber, formed in said portion of said closure wall and covered by said portion of said end wall,
  a sealing gasket compressed between surfaces of said walls peripherally of said interface and constituting a portion of a side surface of each of said passages;
  said end wall presenting, inside said motor chamber about said opening, an upstanding support structure engaged by the body of said motor, said support structure having an elastic sealing ring confined therein in sealing engagement with said motor shaft,
  a cover plate fastened over an end of said housing away from said end wall for closing said motor chamber, and
  means compressed between said cover plate and said motor body for holding said body in working position against said motor support structure and for preventing relative rotation of said motor body and said housing, said means being linked to said motor body in non-rotative relation thereto and having at least one generally radially protruding portion which is confined in said niche.

* * * * *